United States Patent [19]

Hall

[11] Patent Number: 4,637,839

[45] Date of Patent: * Jan. 20, 1987

[54] TREATING AUTODEPOSITED COATING WITH CR COMPOSITION

[75] Inventor: Wilbur S. Hall, Plymouth Meeting, Pa.

[73] Assignee: Amchem Products, Inc., Ambler, Pa.

[ * ] Notice: The portion of the term of this patent subsequent to Mar. 4, 1997 has been disclaimed.

[21] Appl. No.: 299,496

[22] Filed: Sep. 4, 1981

Related U.S. Application Data

[63] Continuation of Ser. No. 855,748, Nov. 29, 1977, abandoned, which is a continuation-in-part of Ser. No. 609,017, Aug. 29, 1975, abandoned.

[51] Int. Cl.⁴ .................... C23C 22/24; C23C 22/67
[52] U.S. Cl. .................................. 148/6.2; 427/341; 427/375; 427/388.4; 427/435
[58] Field of Search .............. 252/79.4; 427/341, 195, 427/375, 435, 388.4; 148/6.2

[56] References Cited

U.S. PATENT DOCUMENTS

| | | | |
|---|---|---|---|
| 3,063,877 | 11/1962 | Schiffman | 148/6.2 |
| 3,585,084 | 6/1971 | Steinbrecher et al. | 427/309 |
| 3,592,699 | 7/1971 | Steinbrecher et al. | 427/341 |
| 3,647,567 | 3/1972 | Schweri | 427/341 |
| 3,795,546 | 3/1974 | Hall et al. | 427/309 |

*Primary Examiner*—Norman Morgenstern
*Assistant Examiner*—Janyce A. Bell
*Attorney, Agent, or Firm*—Alexis Barron

[57] ABSTRACT

In a process wherein a resinous coating is formed on a metallic surface by immersing the surface in an acidic aqueous coating composition containing dispersed particles of resin, wherein said composition forms on said surface a resinous coating which increases in thickness the longer the surface is immersed in the composition and wherein the resinous coating is contacted with an aqueous solution containing Cr to improve properties of the resinous coating, the improvement comprising contacting said resinous coating with an acidic aqueous solution prepared by combining a hexavalent Cr-containing compound, an aqueous mixture of hexavalent chromium/reduced chromium, and an acid or a soluble salt thereof.

5 Claims, No Drawings

4,637,839

TREATING AUTODEPOSITED COATING WITH CR COMPOSITION

CROSS-REFERENCE TO RELATED APPLICATION

This application is a continuation of copending application Ser. No. 855,748, filed Nov. 29, 1977, which is a continuation-in-part of application Ser. No. 609,017, filed Aug. 29, 1975, both now abandoned.

FIELD OF THE INVENTION

This invention relates to the formation of organic coatings on metallic surfaces. More specifically, this invention relates to the deposition on metallic surfaces of organic coatings by contacting the metallic surfaces with an acidic aqueous coating solution containing dispersed particles of an organic coating-forming material such as resin particles.

A relatively recent development in the coating field is the provision of water based coating compositions which are effective, without the aid of electricity, in forming on metallic surfaces immersed therein organic coatings that increase in thickness or weight the longer the time the surfaces are immersed in the compositions. (For convenience, a coating formed from such a composition is hereafter referred to as "an organic coating which grows with time" or as an "autodeposited coating".) Speaking generally, compositions which are so effective comprise acidic aqueous coating solutions having dispersed therein particles of an organic material such as resin particles. Autodeposited coatings are formed from such compositions as a result of their ability to attack and dissolve from the metallic surface metal ions in amounts which cause the particles to deposit on the surface in a manner such that there is a continuous buildup of organic coating on the surface.

Coatings formed from such compositions are distinctly different from coatings formed by immersing the metallic surfaces in conventional latices, that is, compositions comprising solid resin particles dispersed in water. The weight or thickness of a coating formed by immersing a metallic surface in a conventional latex is not influenced by the time the surface is immersed in the latex. It is in the main influenced by the amount of resin solids dispersed in the aqueous medium.

Coatings formed from the aforementioned recently developed coating compositions are also distinctly different from coatings formed from earlier known acidic aqueous coating solutions containing dispersed solid resin particles and relatively high amounts of water soluble corrosion inhibitors, such as compounds containing hexavalent chromium. The use of relatively high amounts of corrosion inhibitors in such solutions deters attack of the metallic surface to an extent such that resinous coatings which grow with time are not obtained. Thus, resinous coatings formed by immersing metallic surfaces in such compositions are like those formed from immersing the metallic surfaces in conventional latices in that they do not grow with time.

The use of the recently developed coating compositions which produce coatings which grow with time offers a number of advantages. For example, other factors held constant, they can be used to apply thicker organic coatings to the metallic surface in a shorter period of time and in a one-step operation. Also, the coating thickness can be controlled by varying the immersion time of the metallic surface in the coating composition. In general, coatings which have improved corrosion resistant properties and aesthetic appearance are obtainable. These are but a few of the advantages which flow from the use of said compositions.

The aforementioned type of composition is capable of forming organic coatings of excellent quality. However, for certain applications it is desired that the corrosion resistant properties of the coating be better than those possessed by the coating formed from said composition and/or that the coating have a different appearance from that of the coating formed from said composition.

The present invention relates to improving the corrosion resistant properties of autodeposited coatings and providing coatings which have a matte, dulled or lusterless appearance rather than a glossy appearance.

REPORTED DEVELOPMENTS

It is known to improve the corrosion resistant properties of autodeposited coatings by contacting the wet or unfused coating with: (a) an aqueous solution of hexavalent chromium, the source of which may be a water or acid soluble chromate or dichromate or $CrO_3$; (b) an aqueous solution of hexavalent chromium and formaldehyde-reduced forms of hexavalent chromium; or an aqueous solution of phosphoric acid. For example, see U.S. Pat. Nos.: 3,585,084; 3,592,699; 3,647,567; and 3,795,546.

The use of an aqueous solution of hexavalent chromium or of a hexavalent chromium/reduced chromium (formaldehyde-reduced) solution to dull the glossy surface of an autodeposited coating is disclosed also in U.S. Pat. No. 3,795,546.

The present invention relates to a chromium-containing aqueous solution which is particularly effective in improving the corrosion resistant properties of an autodeposited coating and dulling the glossy appearances thereof.

SUMMARY OF THE INVENTION

In accordance with this invention, a wet or uncured autodeposited coating is contacted with an acidic aqueous Cr solution comprising:

(a) at least about 0.3 g/l of $Cr^{+6}$ in the form of a hexavalent chromium-containing compound;

(b) a $Cr^{+6}$/reduced Cr mix in an amount such that the total Cr from the mix in the composition is at least about 0.3 g/l, with about 30 to about 60 wt. % of the Cr in reduced form; and (c) an acid, preferably phosphoric acid, or a soluble salt of phosphoric acid.

The use of the above aqueous Cr solution is effective in imparting a matte appearance to an autodeposited coating which otherwise would have a glossy appearance and is effective also in improving the corrosion resistant properties of the autodeposited coating.

DETAILED DESCRIPTION OF THE INVENTION

Coating compositions which are effective in forming organic coatings which grow with time are known. Examples of such coating compositions are described in U.S. Pat. Nos. 3,585,084; 3,592,699; 3,709,743; and 3,776,848 in British Pat. No. 1,241,991, in South African Pat. No. 72/1146 and in Belgian Patent of Addition No. 811,841.

Speaking generally, the acidic aqueous coating compositions of the aforementioned type function to attack and dissolve from a metallic surface contacted therewith metal ions in an amount sufficient to directly or indirectly cause organic particles in the region of the metallic surface to deposit thereon in a continuous fashion, that is, in a manner such that there is a buildup in the amount of organic material deposited on the surface the longer the time the surface is in contact with the composition. This deposition of the organic material on the metallic surface is achieved through chemical action of the coating composition on the metallic surface. The use of electricity which is necessary for the operation of some coating methods, such as the electrocoating method, is not required.

It is believed that the present invention will be used most widely in connection with coatings formed from compositions that contain solid particles of resin dispersed in the aqueous phase of the composition. A preferred composition for use in the practice of the present invention is described in U.S. patent application Ser. No. 562,898, filed Mar. 27, 1975, and abandoned in favor of continuation-in-part application Ser. No. 664,613, filed Mar. 8, 1976, in the name of the applicant herein, and incorporated by reference. Aforementioned Ser. No. 664,613 was abandoned in favor of continuation application Ser. No. 907,902, filed May 22, 1978, which issued as U.S. Pat. No. 4,191,676 on Mar. 4, 1980. The preferred composition has a pH of about 1.6 to about 4 and is prepared from water, a ferric-containing compound, most preferably ferric fluoride, in an amount such that it contains the equivalent of about 0.5 to about 3.5 g/l of ferric iron, about 0.2 to about 5 g/l of HF, a pigment such as carbon black, and about 50 to about 100 g/l of resin particles which are all of substantially the same size and substantially chemically homogeneous, that is, each particle is comprised of the same monomeric constituents present in substantially the same proportions or resin particles which are prepared by copolymerizing the following monomers:

(1) about 25 to about 70, and preferably about 40 to about 65 wt. % of a conjugated diene having, for example, 4 to about 9 carbon atoms, such as butadiene or isoprene;

(2) about 5 to about 70, and preferably about 30 to about 65 wt. % of $CH_2=CHR$, wherein R is an aryl or a cyano group, for example, styrene or acrylonitrile;

(3) about 1 to about 50, and preferably about 3 to about 15 wt. % of a vinyl halide such as vinyl chloride or vinylidene chloride; and (4) about 0.5 to about 15, and preferably about 1 to about 4 wt. % of a monoethylenically unsaturated monomer having a functional group selected from the class consisting of amide and carboxylic groups, such as acrylamide, methacrylamide, octyl acid maleate and monoethylenically unsaturated monocarboxylic and dicarboxylic acids having about 3 to about 12 carbon atoms, and preferably about 3 to about 5 carbon atoms, such as, for example: acrylic acid; cinnamic acid; methacrylic acid; crotonic acid; itaconic acid; maleic acid; and fumaric acid. The resin is used most conveniently in the form of a latex which can be prepared according to available techniques.

A particularly preferred latex contains particles of resin prepared from the aforementioned monomers, which particles are chemically and physically homogeneous. The resin particles of the preferred latex are prepared from styrene, butadiene, vinylidene chloride and methacrylic acid. In addition, the emulsifier content of the preferred latex is about 1 to about 4% based on the resin solids and comprises at least 90 wt. %, most preferably 100 wt. % of an anionic emulsifier such as a sulfonate, for example, sodium dodecylbenzene sulfonate, or a sulfosuccinate, for example, sodium oleoyl isopropanolamide sulfosuccinate, or a mixture thereof.

Although the coating composition can be contacted with the metallic surface in a variety of ways, it is believed that the most widely used method of contact will comprise immersing the metallic surface in the coating composition at room temperature. As mentioned above, the longer the metallic surface is immersed in the coating composition, the greater the build-up in coating thickness. It is believed that for most applications, desired coating thicknesses can be obtained by immersing the metallic surface in the composition for a period of time within the range of about 30 seconds to about 3 minutes. However, it should be understood that longer or shorter periods of time can be used.

Agitating the composition aids in maintaining it uniform. Also, agitation of the composition is effective in improving the uniformity of the coatings formed.

Water rinsing the coated surface after it has been withdrawn from the composition, and before significant drying takes place is effective in removing therefrom residuals such as acid and other ingredients of the bath that adhere to the coated surface. If such residuals are allowed to remain on the coated surface, they may change or adversely affect the quality of the coating. For a specific application, a determination can be made as to whether the residuals cause adverse effects which are not tolerable. If they do, they should be removed, for example, by water rinsing with tap or deionized water. If they do not, this step of removing them can be avoided.

Following any water rinse step that might be employed or after the coated surface is withdrawn from the composition, it is subjected to the aqueous chromium composition of this invention (described in detail below) and then dried. Fusion of the resinous coating renders it continuous, thereby improving its resistance to corrosion and adherence to the underlying metallic surface.

The conditions under which the drying and/or fusion operation is carried out depend somewhat upon the type of resin employed. In general, heat will be required to fuse the resin. The corrosion resistant properties of coatings fused at elevated temperature have been observed to be better than coatings which have been air dried. However, there are applications where air dried coatings can be used satisfactorily. The fusion of the coating should be carried out below temperatures which cause the resinous coating to degrade. Exemplary conditions used in fusing coatings produced according to the present invention are temperatures within the range of about 100° to about 200° C. for periods of time within the range of about 10 to about 30 minutes, depending on the mass of the coated part. Baking the coating for a period of time until the metallic surface has reached the temperature of the heated environment has been used effectively.

For applications in which it is desired that the coated surface have particularly good corrosion resistant properties and a matte appearance, as opposed to a glossy appearance, the coated surface is subjected to the aqueous chromium composition of the present invention prior to the curing or fusing of the coating. The Cr composition of the present invention is prepared by mixing in water a soluble hexavalent chromium compound, an aqueous mixture of hexavalent chromium/reduced chromium ($Cr^{+6}$/reduced Cr), and acid or salt thereof.

Examples of soluble hexavalent chromium compounds that can be used are ammonium dichromate and alkali metal dichromates, for example, lithium dichromate, sodium dichromate and potassium dichromate.

With respect to the $Cr^{+6}$/reduced Cr constituent, it is obtained by reacting a hexavalent chromium compound or mixture of such compounds with a material that is effective in reducing some of the hexavalent chromium. Although various materials can be used to accomplish this, as is known in the art, it is preferred to use formaldehyde as the reducing agent as disclosed in U.S. Pat. No. 3,063,877. For example, an aqueous concentrate of the composition is prepared by treating an aqueous solution of hexavalent chromium compound, for example, an aqueous solution of chromic acid, with formaldehyde to reduce a portion of the hexavalent chromium.

The phrase "$Cr^{+6}$/reduced Cr mix" as used in the description and claims of this specification refers to the reaction product obtained by reacting a hexavalent chromium compound or mixture of such compounds with a material that is effective in reducing some of the hexavalent chromium.

For purposes of this invention, about 30 to about 60 wt. % of the hexavalent chromium should be reduced. Suitable amounts of reducing agent can be used to reduce the desired amount of hexavalent chromium. In preparing the aqueous concentrate of $Cr^{+6}$/reduced Cr mix, it may be found that the concentrate tends to gel on standing. The tendency toward gel formation may be substantially eliminated by the addition of small amounts of phosphoric acid either before or after the concentrate is diluted. As little as about 0.05 ml. of 75% $H_3PO_4$ solution (about 0.06 g of $H_3PO_4$) per gram of the total chromium (both $Cr^{+6}$ and reduced Cr) is usually sufficient to prevent such gelling. Higher amounts of $H_3PO_4$ can be used.

In addition to functioning as an anti-gelling agent, the use of phosphoric acid is an important factor in the dulling effect that the composition has on autodeposited coatings that are normally glossy. This will be seen from the examples below. Although phosphoric acid is preferred for use in the composition of the invention, one or more soluble salts of phosphoric acid, or another mineral acid, including one or more of hydrochloric, sulfuric or nitric acid, can be used in place of phosphoric acid or in admixture therewith. Exemplary soluble salts of phosphoric acid include ammonium, alkali metal and alkaline earth metal salts, including the monobasic, dibasic and tribasic forms thereof. The phosphate salt should be used in an amount of at least about 0.06 g/l of the total chromium (both $Cr^{+6}$ and reduced Cr) from the mix. The amount of HCl, $H_2SO_4$ or $HNO_3$ used should be at least about 0.5 to about 1 g/l of composition depending on the particular acid used. For example, the minimum amount of HCl to obtain good dulling is somewhat higher than the minimum amount of $H_2SO_4$.

It is noted that developmental work has shown that aqueous solutions of acid and soluble hexavalent chromium (that is, solutions which do not contain reduced Cr), compounds, such as dichromate are effective in imparting a matte finish to autodeposited coatings that would otherwise be glossy. However, the appearance of such coatings leaves something to be desired in that the coatings tend to have a non-uniform appearance and/or the matte appearance is not prevalent at all angles of light reflection. For example, although coatings treated with the aforementioned type compositions appear dull when viewed at a right angle to the surface, they show gloss or sheen when viewed at lesser angles. In contrast, the use of the composition of the present invention results in a coating which has a uniformly dull or matted appearance. Accordingly, for those applications where such an appearance is considered important, and where corrosion resistance is also an important factor, the composition of the present invention can be used to excellent advantage.

The aqueous chromium solution for treating the coated surface should comprise at least about 0.3 g/l of $Cr^{+6}$ added as a soluble $Cr^{+6}$ compound and a $Cr^{+6}$/reduced Cr mixture in an amount such that the total chromium in the composition from the mixture is at least about 0.3 g/l with about 30 to about 60 wt. % of the Cr in reduced form and preferably about 50 wt. % of the Cr in reduced form. Although the aforementioned ingredients can be used in amounts up to their solubility limits, satisfactory results can generally be attained by using no more than about 3 g/l of $Cr^{+6}$ in the form of the soluble $Cr^{+6}$ compound and a $Cr^{+6}$/reduced Cr mix in an amount such that the total Cr concentration from the mix in the composition is no more than about 3 g/l.

The pH of the composition of this invention is within the range of about 1 to about 4. With pH's of greater than about 4, problems can be encountered with constituents tending to precipitate and with pH's of less than about 1, the composition can tend to adversely effect the coated substrate. Preferably, the pH is about 2.5 to about 3.

The dilute aqueous Cr composition can be prepared by diluting with an appropriate amount of water an aqueous concentrate containing: (A) about 25 to about 400 g/l of $Cr^{+6}$, added as the soluble $Cr^{+6}$ compound; (B) a $Cr^{+6}$/reduced Cr mix in an amount such that the total Cr concentration from the mix in the composition is about 25 to about 400 g/l with about 30 to about 60 wt. % of the Cr in reduced form; and (C) about 1.5 to about 24 g/l of phosphoric acid.

After treating the coated substrate with the Cr composition of the present invention, the coating of the surface can be fused as described above or it may be rinsed with water prior to the fusion of the coating.

Various types of metallic surfaces can be coated and treated in accordance with the present invention. Ferriferous surface such as, for example, hot rolled and cold rolled steel, and other metallic surfaces, for example, aluminum and zinc, can be used.

EXAMPLES

Examples below are illustrative of the practice of the present invention. The basic coating compositions used in all of the examples were prepared by combining

| Ingredients | Amounts |
|---|---|
| latex containing about 54% solids | 180 g |
| ferric fluoride | 3 g |
| hydrofluoric acid | 2.3 g |
| black pigment dispersion | 5 g |

| Ingredients | Amounts |
|---|---|
| water | to make 1 liter. |

The resin of the latex used in the above composition comprised about 62% styrene, about 30% butadiene, about 5% vinylidene chloride and about 3% methacrylic acid. A film formed from the resin is soluble in refluxing chlorobenzene to the extent of about 13%. That the resin is crosslinked is indicated by its insolubility in Soxhlet extraction with chlorobenzene. The water soluble content of the latex is about 2% based on the weight of dried resin, with the water soluble content comprising about 10% sodium phosphate, about 13% sodium oleoyl isopropanolamide sulfosuccinate and about 75% sodium dodecylbenzene sulfonate, the first mentioned ingredient being a buffering agent used in preparing the latex, and the last 2 mentioned ingredients being emulsifiers. The pH of the latex was about 7.8 and the surface tension thereof about 45–50 dynes/cm. The average particle size of the resin was about 2,000 A.

The black pigment dispersion used in the above composition is an aqueous dispersion having a total solids content of about 36%. Carbon black comprises about 30% of the dispersion. It has a pH of about 10–11.5 and a specific gravity of about 1.17. The dispersion contains a nonionic dispersing agent for the solids, and is sold under the trademark Aquablak 115.

Unless stated otherwise, the metallic surfaces coated in the examples below are unpolished cold rolled steel panels (Q-panels) 3"×4". All metallic surfaces were cleaned with a conventional alkali cleaner and rinsed with water prior to being coated.

The salt spray test used in the examples was ASTM D-117, with the coating being scribed. At the completion of the salt spray tests, the panels were rated on a numerical scale ranging from 10 to 0, the number "10" representing no failure, that is, the appearance of the coated panel before and after the salt spray test was basically the same, and the number "0" representing a coating failure of 1" or more from the scribe.

EXAMPLE 1

One liter of aqueous Cr solution was prepared by combining 3.6 g of ammonium dichromate with a formaldehyde reduced aqueous $CrO_3$ solution in an amount such that the total Cr concentration from this solution was about 1.5 g, one-half of which was in reduced form, and about 0.3 g of $H_3PO_4$.

A steel panel was immersed in the above described coating composition for 2 minutes. The coated panel was then partially dried in air for 1 minute, immersed in the aforementioned aqueous Cr solution for 30 seconds and thereafter baked for 10 minutes at 170° C. The baked coating had a matte appearance. After 168 hours of salt spray testing, the rating of the coating was 9 and after 336 hours and 480 hours of testing the rating was 7.

EXAMPLES 2 TO 5

The aqueous chromium solutions set forth in Table 1 below were prepared.

TABLE 1

| Ex. No. | Formaldehyde-Reduced Cr Solution $Cr^{+6}$, g/l | reduced Cr, g/l | g/l of $Cr^{+6}$ from $(NH_4)_2Cr_2O_7$ |
|---|---|---|---|
| 2 | 0.13 | 0.13 | 0.25 |
| 3 | 0.25 | 0.25 | 0.50 |
| 4 | 0.50 | 0.50 | 0.99 |
| 5 | 0.75 | 0.75 | 1.49 |

The compositions of the above examples contained also 0.125, 0.25, 0.5 and 0.75 g/l respectively of 75% $H_3PO_4$. Steel headlight mounting rings were immersed in the above described coating composition for 75 seconds. The coated rings were then partially dried in air for 1 minute, immersed in water for 30 seconds, immersed in the aqueous chromium solutions of Example Nos. 2 to 5 above and then baked for 10 minutes at 220° F. and for 10 minutes at 315° F. The baked coatings had a matte appearance. The coated parts were then subjected to salt spray testing for 168 hours. The salt spray ratings are set forth below.

| Cr Solution | Rating |
|---|---|
| Ex. No. 2 | 5 (coating blistered) |
| Ex. No. 3 | 7 |
| Ex. No. 4 | 7 |
| Ex. No. 5 | 7 |

A mounting ring treated in the same way, but without the Cr treatment, had a glossy coating and rating of 0.

EXAMPLE 6

An aqueous chromium concentrate containing 150 g/l of $Na_2Cr_2O_7.2H_2O$ and a mixture of $Cr^{+6}$/formaldehyde-reduced Cr in an amount such that the total Cr concentration from the mixture in said concentrate was 50 g/l with about 50 wt. % of the Cr in reduced form, and 25 g/l of 75 wt. % $H_3PO_4$ was prepared. The concentrate was diluted with water to provide a Cr treatment solution comprising about 3 wt. % of the concentrate.

A hot rolled steel car frame was immersed in the coating composition described above for 90 seconds. The coated frame was dried partially in air for 60 seconds, immersed in water for 30 seconds, immersed in the above described Cr solution for 30 seconds and then baked for 15 minutes at 315° F. The black coating on the frame had a matte appearance and the salt spray rating after 504 hours of testing was 9. A frame subjected to the same process steps, except for the Cr treatment step, has thereon a glossy coating and a rating of 0 after 504 hours of salt spray testing.

The next group of examples is comparative in nature and shows the results obtained when utilizing an aqueous solution of sodium dichromate and also an aqueous solution containing a mixture of sodium dichromate and one of the following acids: phosphoric; hydrochloric; and sulfuric. (Examples C-1 to C-11 in Table 2 below). For comparison, the testing included the use of a composition within the scope of the present invention (Example 7 in Table 2).

In conducting the tests, cold rolled steel panels were immersed for 90 seconds in a coating composition of the type described above, withdrawn therefrom, dried in air for about one minute, rinsed with water and then immersed for 30 seconds in one of the chromium-containing compositions identified in Table 2 below. The Cr-rinsed coated panels were then baked in an over for ten minutes at 170° C. The appearances of the baked panels are set forth in Table 2 below.

TABLE 2

| Ex. No. | Na dichromate dihydrate | $H_3PO_4$ | HCL | $H_2SO_4$ | pH | Appearance of Coated Panels |
|---|---|---|---|---|---|---|
| C-1 | 9 | — | — | — | 4.0 | jet, uniformly glossy |
| C-2 | 9 | * | — | — | 3.6 | jet, uniformly glossy |
| C-3 | 9 | * | — | — | 3.2 | jet, non-uniform, dull-sheen |
| C-4 | 9 | * | — | — | 2.9 | jet, non-uniform, dull-sheen |
| C-5 | 9 | 0.5 | — | — | nr** | jet, non-uniform, dull-sheen |
| C-6 | 9 | 1.2 | — | — | nr** | jet, non-uniform, dull-sheen |
| C-7 | 9 | 2.3 | — | — | nr** | jet, non-uniform, dull-sheen |
| C-8 | 9 | 3.5 | — | — | nr** | jet, non-uniform, dull-sheen |
| C-9 | 9 | 5.8 | — | — | nr** | jet, non-uniform, dull-sheen |
| C-10 | 9 | — | 2.1 | — | nr** | jet, non-uniform, dull-sheen |
| C-11 | 9 | — | — | 9 | nr** | jet, non-uniform, dull-sheen |
| 7 | comp. of the invention[1] | | | | 2.9 | jet, uniformyl dull |

*amount such that composition had the stated pH
**not recorded
[1] 4.5 g/l of $Na_2Cr_2O_7.2H_2O$ (0.35 g/l of Cr), formaldehyde-reduced chromium mix in an amount such that the total Cr concentration from the mix was about 1.5 g/l, one-half of which was in reduced form, and 0.53 g/l of $H_3PO_4$ From table 2 above, it can be seen that the dichromate-only solution was not effective in dulling the coating and that the dichromate/acid solutions were but partly effective in reducing gloss. On the other hand, the composition of the present invention (Example No. 7) resulted in a coating that was uniformly dull.

The next two examples show the use of a coating composition within the scope of the present invention and the use of a comparative composition alike in all respects except that it did not contain phosphoric acid, and the effects that the compositions had on the appearances of autodeposited coatings.

EXAMPLE C-12

An aqueous Cr-containing solution was prepared from a formaldehyde-reduced $CrO_3$ mix and sodium dichromate dihydrate. The amounts of the ingredients used were such that the solution contained about 0.8 g/l of Cr from the sodium dichromate dihydrate, and about 1.56 g/l of total chromium, about 40% reduced, from the formaldehyde-reduced $CrO_3$ mix. This solution was used to treat an autodeposited coating that was formed on a cold rolled steel panel in the following way. The panel was immersed for 90 seconds in a coating composition of the type described above, withdrawn therefrom, dried in air about 1 minute, rinsed with water and then immersed for 30 seconds in the aforementioned chromium-containing solution. The Cr-rinsed coated panel was then baked in an oven for 15 minutes at 160° C. The baked panel had a glossy appearance.

EXAMPLE 8

The same procedure as described in Example C-12 was followed except that phosphoric acid was added to the formaldehyde-reduced $CrO_3$ concentrate that was used in preparing the solution. The amount of phosphoric added was such that the solution that was used to treat the autodeposited coating contained about 0.52 g/l of phosphoric acid. The baked coating had a matte appearance.

In summary, it can be said that the present invention affords the means whereby autodeposited coatings of the type that normally have a high gloss can be changed to have a dull appearance and their corrosion resistant properties can be improved by a single post-treatment step.

I claim:

1. A coating process for forming on a metallic surface an autodeposited coating of the type which in fused form tends to have a glossy appearance comprising forming on the metallic surface an unfused autodeposited coating by contacting the metallic surface with an autodepositing coating composition comprising an aqueous acidic solution prepared from a ferric iron-containing compound and HF, and including dispersed resin particles, modifying the properties of the coating so that it has a uniformly matte appearance and improved corrosion resistance in its fused form by contacting the unfused coating with an acidic aqueous chromium-containing composition having a pH of no greater than about 4 and consisting essentially of the following dissolved ingredients:
  (A) ammonium, potassium or sodium dichromate in an amount equivalent to about 0.3 to about 3 g/l of $Cr^{+6}$;
  (B) formaldehyde-reduced chromic acid in an amount equivalent to about 0.3 to about 3 g/l of chromium, with about 50 wt. % of the chromium being in reduced form; and
  (C) at least about 0.06 g of phosphoric acid for each gram of total chromium in said mix;
and thereafter fusing the unfused coating.

2. A coating process according to claim 1 wherein the coating composition used to form said autodeposited coating has a pH of about 1.6 to about 4 and comprises
  (A) about 50 to about 100 g/l of resin solids selected from the class consisting of resin particles prepared by polymerizing (1) a conjugated diene, (ii) $CH_2$=CH—R wherein R is an aryl or cyano group, (iii) a vinyl halide, and (iv) a monoethylenically unsaturated monomer having a functional group selected from the class consisting of amide and carboxylic groups; and resin particles which are substantially chemically and physically homogeneous;
  (B) ferric fluoride in an amount such that it contains the equivalent of about 0.5 to about 3.5 g/l of ferric iron;
  (C) about 0.2 to about 5 g/l of HF; and
  (D) black pigment.

3. A process according to claim 2 wherein said conjugated diene is butadiene, said $CH_2$=CHR is styrene, said vinyl halide is vinylidene chloride and said unsaturated monomer is methacrylic acid.

4. A process according to claim 3 wherein said metallic surface is a ferriferous surface.

5. A process according to claim 4 wherein said ferriferous surface is hot rolled steel.

* * * * *